Patented July 25, 1939

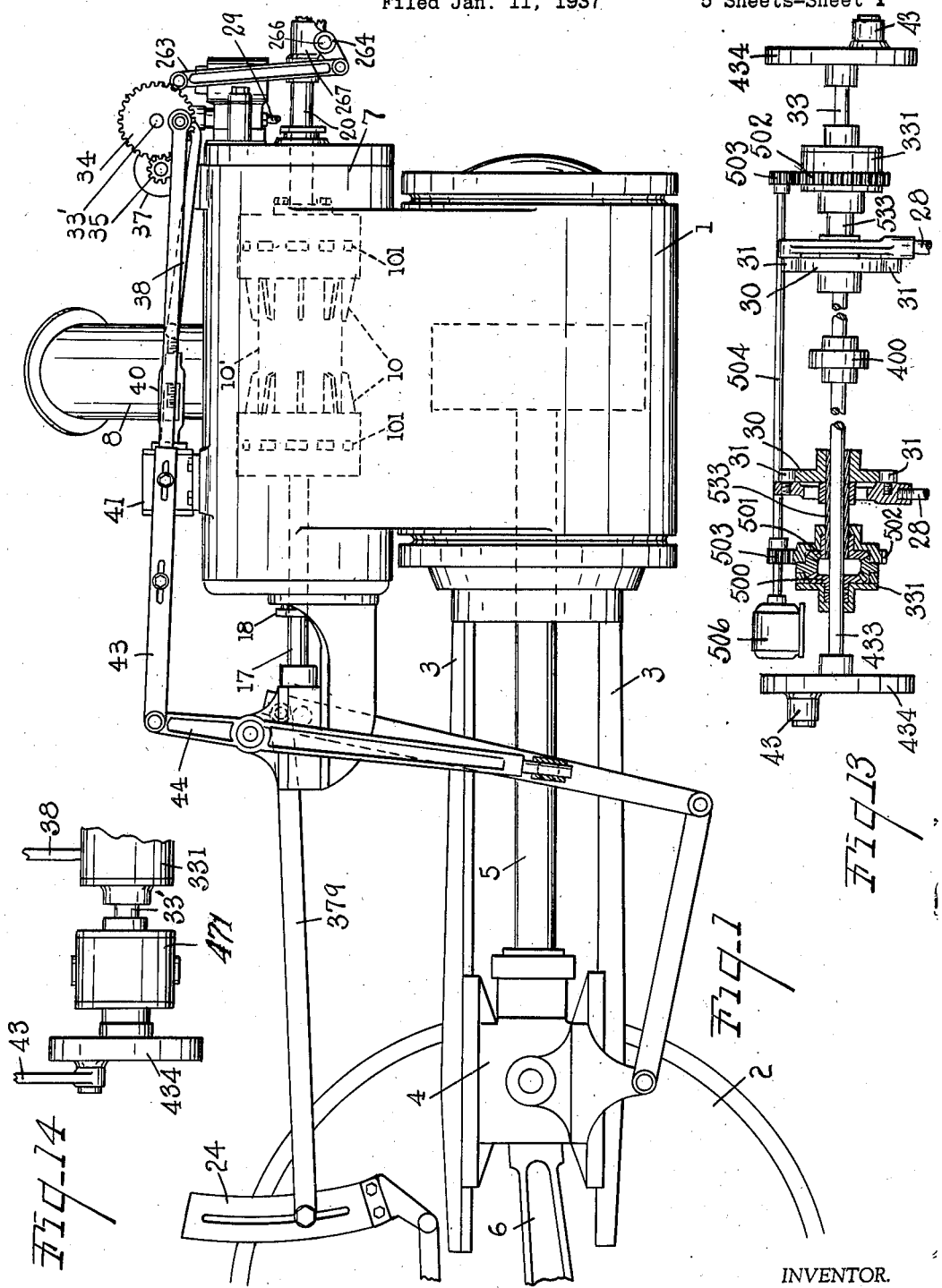

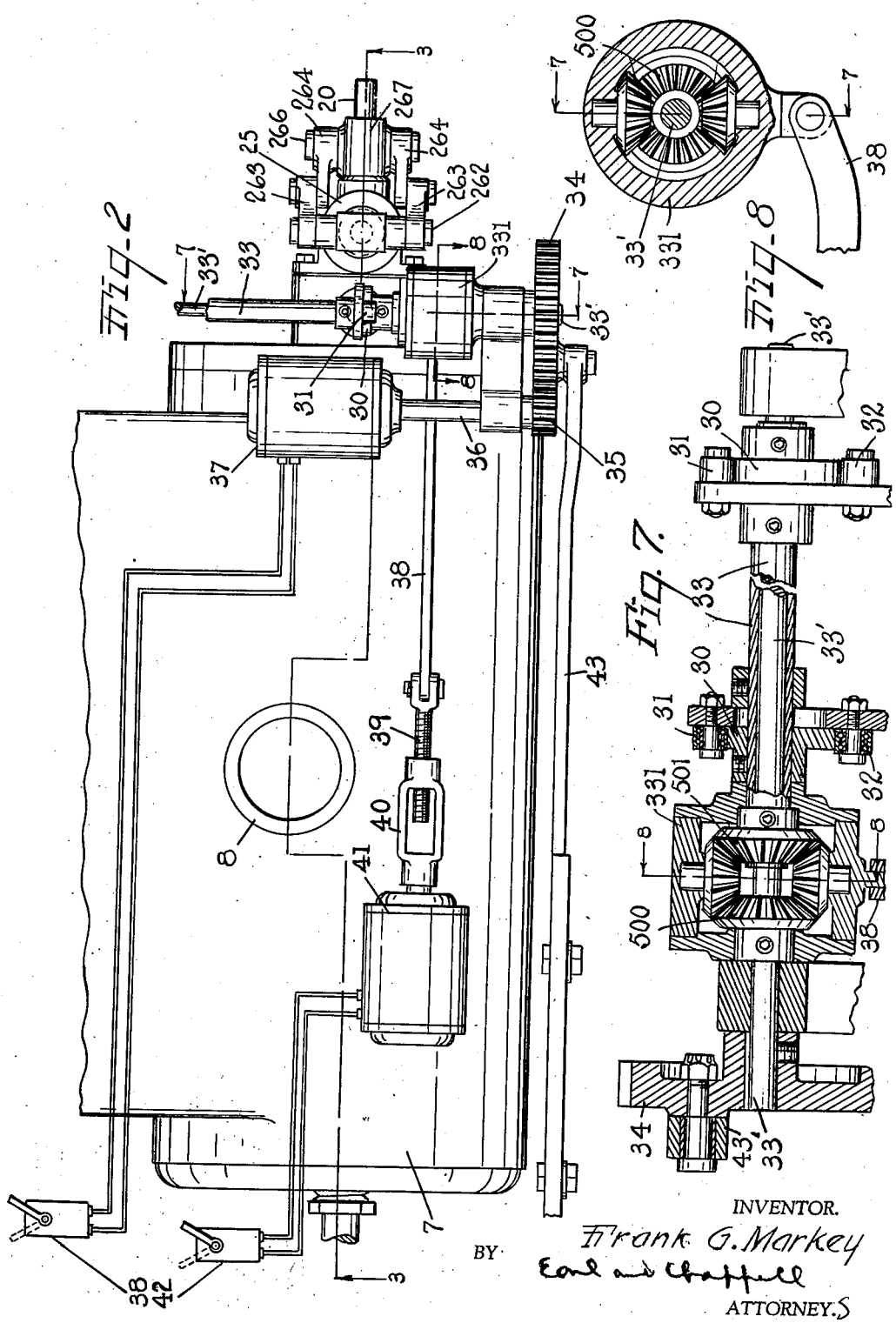

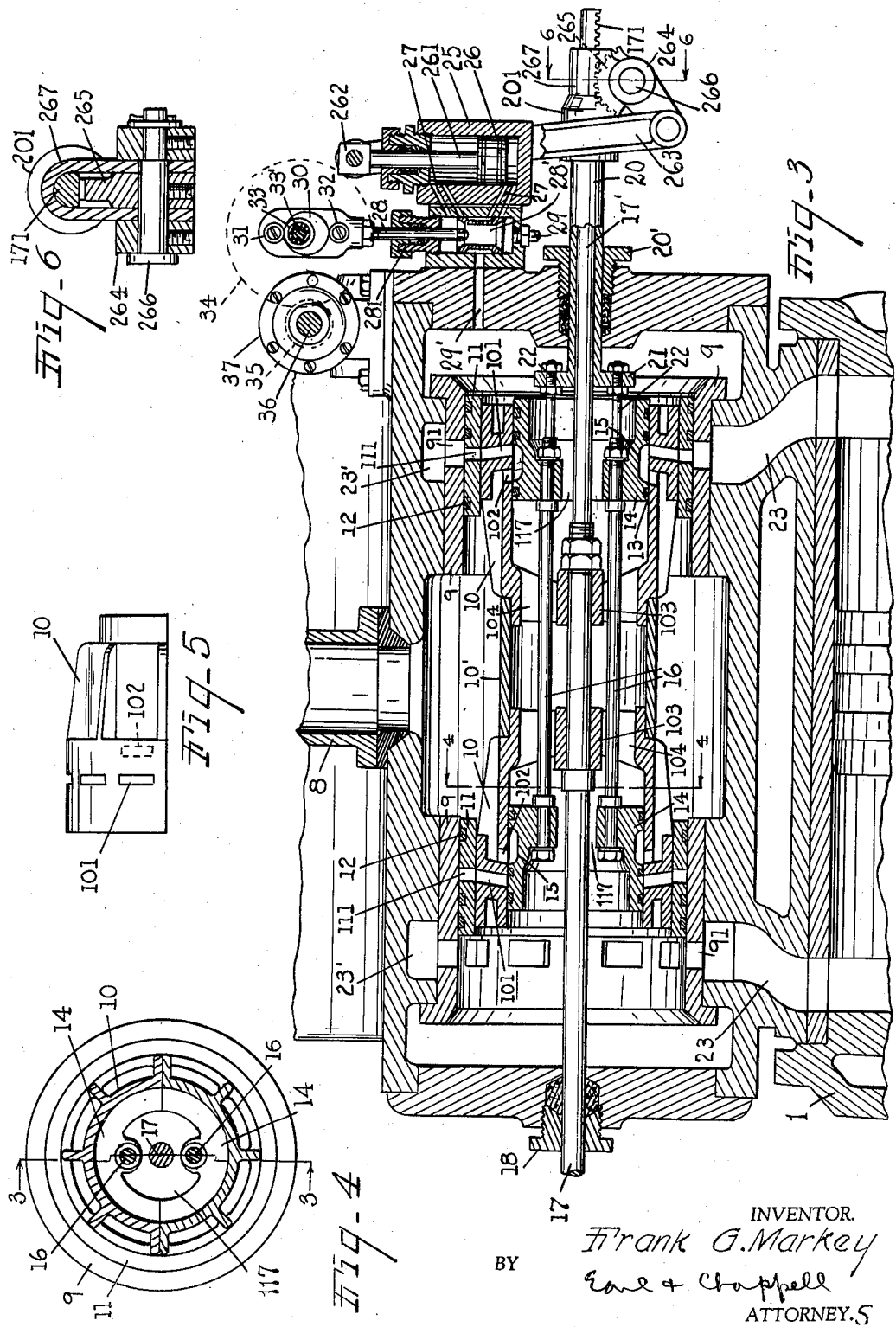

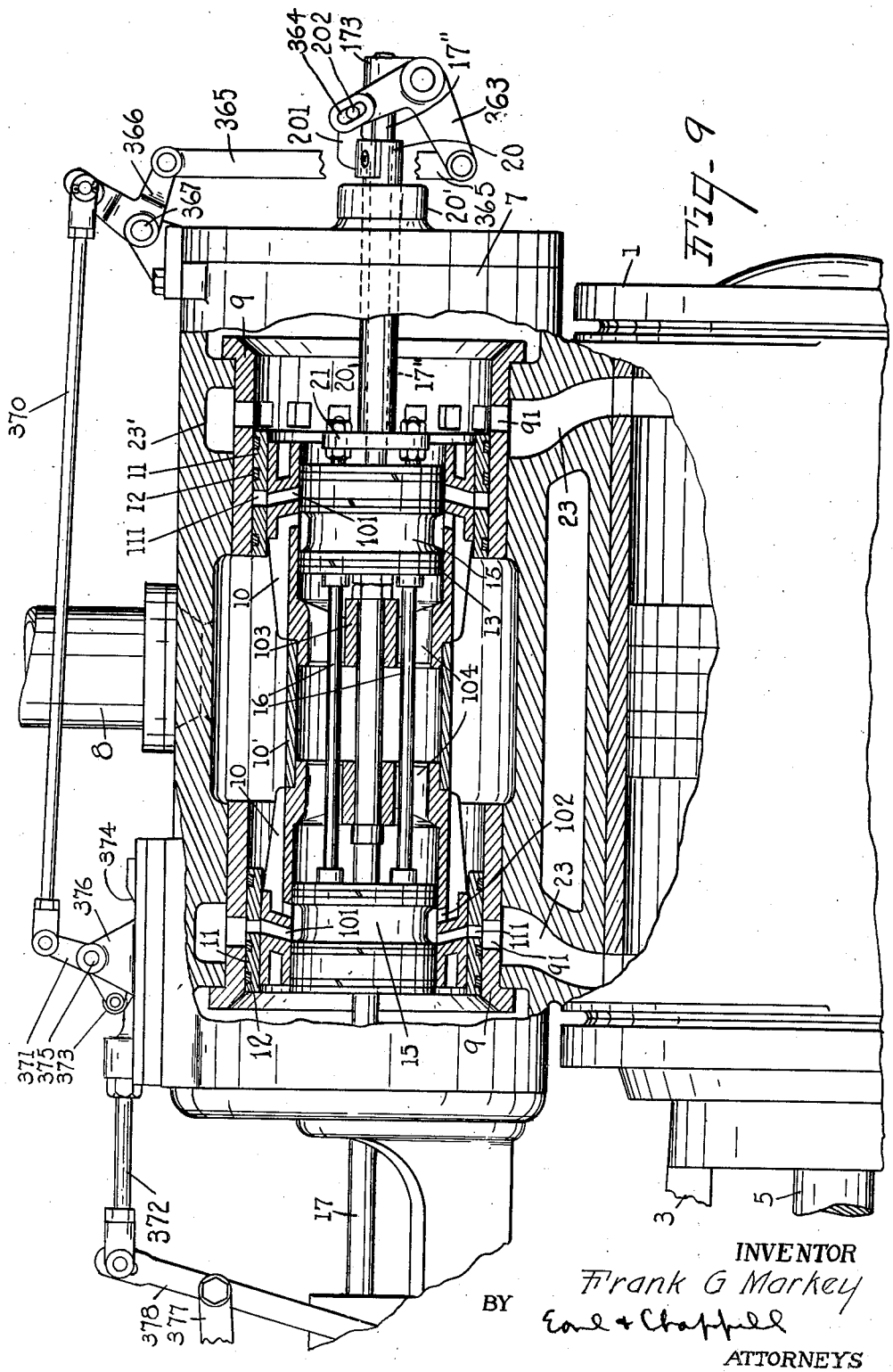

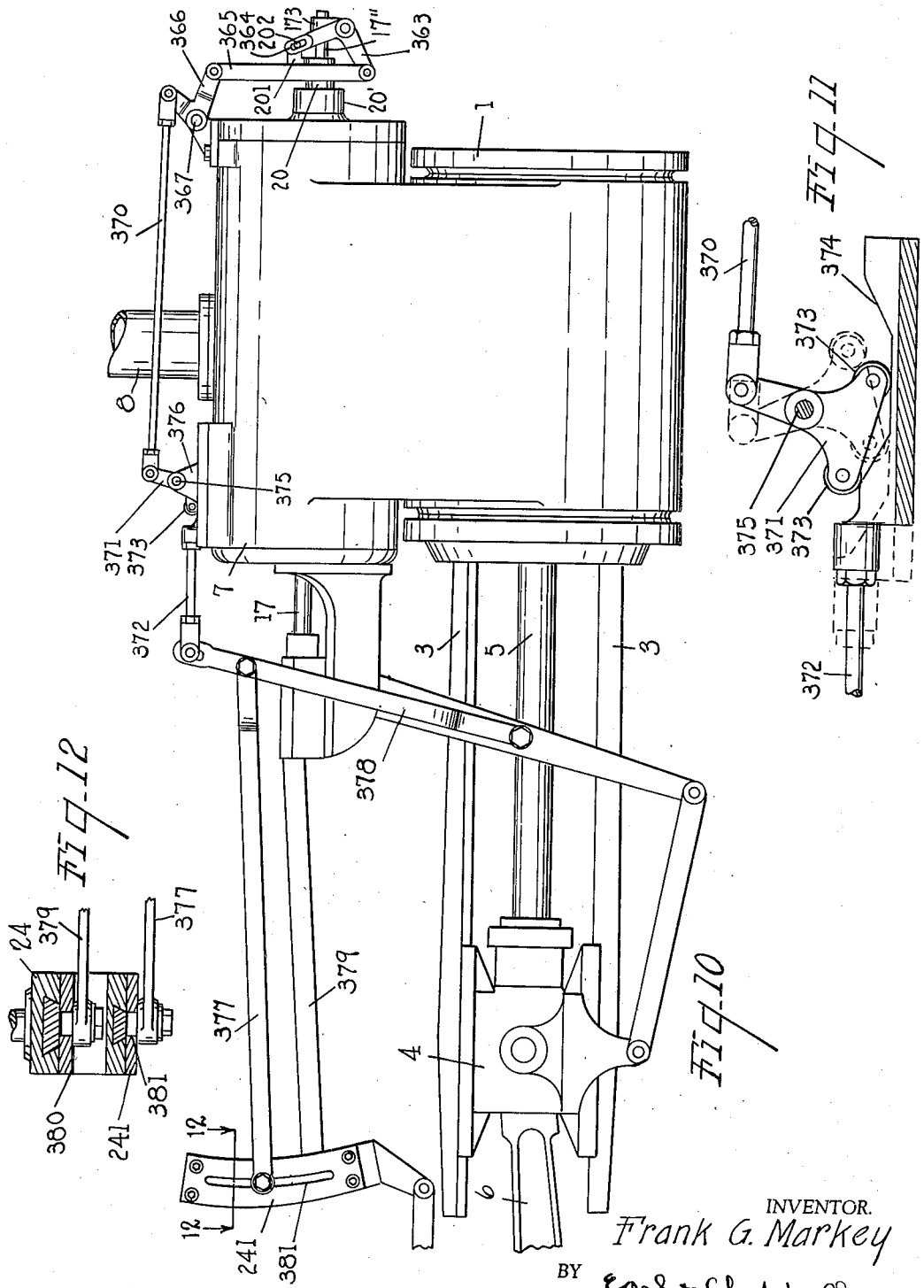

2,167,280

UNITED STATES PATENT OFFICE 2,167,280

LOCOMOTIVE VALVE MECHANISM

Frank G. Markey, Battle Creek, Mich.

Application January 11, 1937, Serial No. 120,010

13 Claims. (Cl. 121—146)

This invention relates to improvements in locomotive valve mechanism. It has to do particularly with the details of locomotive valves and the control and timing of the cut-off thereof.

This invention is an improvement on the standard locomotive valve mechanism in which a single valve controls the cylinder and valve events. In such a mechanism there are many disadvantages. If the engine is operated at a short cut-off, it is very inefficient. The shortening of the valve stroke to provide the short cut-off cuts down the port opening on admission to an objectionable degree. During operation, at short cut-off the port is not fully open for practically all of the admission and it is necessary to provide considerable lead to get steam into the cylinder at all. When the cut-off occurs under these circumstances, the valve closes the other end of the cylinder entirely too soon, so that compression takes place entirely too soon. In this invention, I eliminate these disadvantages and make possible not only a short cut-off, but make possible a very efficient long cut-off which is practically impossible with the ordinary type of mechanism.

The objects of this invention are:

First, to provide a new and improved valve mechanism to increase the efficiency of the locomotive provided therewith.

Second, to provide new and improved cut-off valve mechanism for use in connection with steam locomotives.

Third, to provide an improved construction and adjustment for valves to properly time cylinder and valve events to obtain high efficiency in operation.

Further objects and advantages pertaining to details of my invention will appear from the detailed description to follow. I accomplish the objects of my invention by the structure illustrated in the accompanying drawings, in which:

Fig. 1 is a fragmentary elevation of the side of a locomotive showing as much as necessary to properly indicate the relations of the different parts of my improved construction.

Fig. 2 is a plan view of the parts of Fig. 1 constituting the valve mechanism of one side of a steam locomotive.

Fig. 3 is a detail longitudinal sectional view through the engine valve and parts of the engine cylinder with my improved valve and mechanism in position, showing full details of the valve and cut-off valve and the valve actuating means and timer therefor of the steam control type. The view is taken on an irregular section line 3—3 of Fig. 2.

Fig. 4 is a detail sectional view through the main valve shell and cut-off valve taken on line 4—4 of Fig. 3.

Fig. 5 is a detail elevational view of one end or head of the valve only, as seen in section in Figs. 3, 4 and 9.

Fig. 6 is a transverse enlarged detail section on the line 6—6 of Fig. 3, showing the actuator for the cut-off valve.

Fig. 7 is a detail longitudinal sectional view on the line 7—7 of Figs. 2 and 8, showing the cut-off actuating and timing means.

Fig. 8 is an enlarged detail sectional view on the line 8—8 of Figs. 2 and 7, showing the differential housing and a portion of the adjusting link connected thereto for controlling the timing of my device.

Fig. 9 is a vertical longitudinal sectional detail elevation similar to that in Fig. 3, showing a modified adjustment and timing mechanism for the cut-off valve controlled purely by direct connection to the links of the locomotive.

Fig. 10 is a view of the structure shown in Fig. 9 showing the relation of the different parts of my improved valve and cut-off control to the left of the locomotive.

Fig. 11 is a detail view in section showing a portion of the timing mechanism.

Fig. 12 is a detail view in section taken on line 12—12 of Fig. 10.

Fig. 13 is a detail view showing an arrangement whereby the valves of the servo motors for operating my cut-off valve mechanism are controlled by driving mechanism connected to the crosshead of each individual cylinder.

Fig. 14 is a detail view showing a modification of my construction in which a turbine is employed for driving the crankshaft which drives the cam shaft through the differential. This turbine is employed only for carrying the crank over dead center.

In the drawings, 1 is the main engine cylinder. In ordinary locomotive construction there is one such cylinder and drive on each side of the locomotive. For the purpose of describing this invention it is not necessary to describe both cylinders and drives and I will describe in detail that on one side of the locomotive only. The cylinder and drive on the opposite side of the locomotive are exactly symmetrical to the cylinder and drive here shown and described in detail, if it is desired to use the two way drive.

2 is the driving wheel of the locomotive and is illustrated diagrammatically. 4 is the crosshead of the engine traveling on the slideways 3. A piston rod 5 has associated therewith the pitman 6 for driving the locomotive driving wheel 2. The engine valve casing is here shown as being integral with the engine cylinder casing 1. It is provided with a connection 8 to the source of steam supply. Steam is delivered from the main steam chest to the engine valves as is customary in ordinary locomotive construction.

Within the bore of the cylinder are bushings 9 at each end of the valve casing and the main valve heads reciprocate in these bushings. Each bushing 9 contains a series of ports 91 that lead to the steam passages to the engine cylinder or piston. The main valve heads are indicated at 10 and they reciprocate in the bushings 9 to control the valve ports 91 to and from the engine. The valve heads 10 are reduced in diameter toward the center of the valve and are connected by a sleeve 10'. Bushings or shells 11 are disposed around the heads 10 and contain piston packing rings 12 to insure a steam tight fit of the valves in the bushings 9. The bushings 11 are provided with a series of ports 111 cooperating with the ports 91 of the bushings 9. The heads 10 are made in symmetrical halves, illustrated in Figs. 4 and 5, and contain the main ports 101 corresponding and cooperating with the ports 111 and with the ports 91. Toward the central part of the valve and in proximity to the ports 101 are a series of ports 102 which supply steam to the ports 101 and are controlled by the cut-off valve, as will be later explained.

Within each valve head 10 are cylindrical ports 13 in which the cut-off valve heads 14 reciprocate. In the head 14 is an annular groove or port 15 which subtends and connects the ports 101 and 102 to permit passage of steam from the source 8 and the steam chest through ports 102 to ports 101, when the valve is in the position shown at the right in Fig. 3, and which prevents passage of steam from port 102 to port 101 when the valve is in the cut-off position as shown at the left hand of Fig. 3.

The two cut-off valve heads are coupled together by a pair of parallel rods, each indicated at 16, which are disposed within the sleeve 10'. Each main valve head 10 is provided with a central hub 103, each of which is connected to its head by spider arms 104. The rods 16 are disposed in the spaces between these spider arms so that the cut-off valve is free to reciprocate within the main engine valve. The spiders provide an open space at the center of the main valve to permit the passage of exhaust steam through the main valve. This steam passes also through the openings 117 in the cut-off valve (see Figs. 3 and 4).

Fig. 3 shows the cut-off valve moved to the right end of the main valve 10. Its other extreme position is identically the same, except that it is at the left end as viewed in Fig. 3.

The main valve is operated in the usual manner by the main valve stem 17 which extends axially through the central bore of the valve and is connected by a suitable screw thread and lock nut to the central hubs 103 of the main valve, so that the main valve 10 and the cut-off valve 14 may be moved together as a unit by the main valve stem 17 while permitting the cut-off valve to be moved relatively to the main valve by an independent mechanism to be later described.

The main valve stem 17 has a reduced extension 17' which extends into the valve casing through the hollow cut-off valve stem 20. The hollow cut-off valve stem 20 extends through a stuffing box 20' and is flanged at 21 and connected by bolts 22 to the cut-off valve 14. The bolts 22 are extensions of the bolts 16 which connect the two heads of the cut-off valve. These valves control the admission of steam to the steam passages 23 with their annular passages 23'. When the main valve which is controlled by the valve stem 17 is pushed to the extreme right as seen in Fig. 3, ports 101, 111 and 91 register to form a passage to admit steam to the right hand end of the cylinder. The cut-off valve, being also moved to the extreme right, connects port 102 through the annular port 15 to the port 101 so that steam will pass from the center of the steam chest through these ports to the right hand end of the cylinder.

When steam has been admitted to the right hand end of the cylinder for the desired length of time, the cut-off valve is moved to the fullest extent toward the left, which cuts off the passage of steam to the right hand end of the cylinder, ending the cylinder event known as admission and going into the cylinder event known as expansion. This movement of the cut-off valve 14 is timed as desired by the operator of the engine to secure the fullest effect of the expansion of steam in the cylinder and since the main valve 10 is at the right hand position, the ports 91 are open to the exhaust passage. This allows a selective period of compression in the left hand end of the cylinder to work against the movement of the piston to the left since the cut-off valve and the main valve operate independently. It is possible to have practically no period of compression in the left hand end of the cylinder.

When the piston has nearly completed its movement to the left, the main valve 10 is shifted to the extreme left hand position to release the steam in the right hand end of the cylinder and to start the admission of steam to the left hand end of the cylinder. This reverses the movement of the piston and completes the operation of one cycle of the engine in a manner similar to that described for the right hand end.

The main engine valve may be operated in the usual way by a suitable valve gear. I have shown diagrammatically a Walschaert type of gear, but it will be understood that a Baker or Southern or similar valve gear could be employed. In Fig. 1 the gear shown consists of the valve eccentrics, not shown in detail, and the link 24 indicated diagrammatically in Fig. 1 operating on the usual radius rod connected suitably to the main valve stem 17.

In operation of my device, the main valve and the cut-off valve with their respective stems move together as a unit on the actuation of the main valve by its stem 17, except that the cut-off valve is shifted relatively to the main valve by independent operating means at the desired time. The independent operating means are timed to cooperate with the main engine valve. This is accomplished by a servo-motor comprising the small steam cylinder 25 disposed vertically and transversely on the head of the steam chest. It contains the piston 26 which is operated by the auxiliary valve 28 through ports 27 as indicated. These ports are controlled by the auxiliary valve 28 and its upwardly extending valve stem 28' which reciprocates in the stuffing box 281. The piston head 26 of the servo-motor is provided with a piston rod 261 connected to the crosshead 262 which is connected by links 263 to the rocker 264 on which there is a toothed segment gear 265 carried on a pintle 266 on the bracket 267. The segment gear 265 meshes with rack teeth 171 on the reduced extension 17' of the piston rod. These rack teeth 171 are on the underside of the outer end of the extension 17'.

A U-shaped bracket 267 is mounted on a collar 201 which is fixed to the hollow cut-off valve stem 20 and the extension 17' of the main valve stem reciprocates therein. When the links 263 are moved downwardly as indicated in Fig. 3, they cause the toothed segment gear 265 to rotate in a counter-clockwise direction as viewed in Fig. 3 which shifts the hollow cut-off valve piston rod to the right relative to the piston rod extension 17' causing the cut-off valve 14 to move to the right relative to the main valve 10. An upward movement of the links will, through this mechanism, cause the cut-off valve 14 to shift to the left relatively to the main valve 10, as will be understood. When the main valve and the cut-off valve are shifted as a unit through valve stem 17, there is no relative movement between the two valves due to this linkage with links 63 and relative movement of the two valves will occur only on the operation of the servo-motor as described.

The piston 26 is actuated by steam through the steam passage 29. The steam passage 29 is connected to an independent source of steam or to the boiler above the throttle of the locomotive. The passage of steam to the passage 29 is controlled by a conventional throttle provided with controls in the cab of the locomotive so that the engineer may control the operation of the servo-motor 25. A piston valve 28 is provided for controlling the passage of steam from the passage 29 to the servo-motor. This valve consists of a hollow valve body 28' of conventional design having a valve stem and is what is known as an outside admission valve, the exhaust passing through the passage 29' to the exhaust of the main engine valve.

The valve 28 is controlled by eccentric timing cam 30 which revolves between cam rollers 31 and 32 carried on a suitable crosshead 331 on the valve stem 28' which reciprocates in its stuffing box 281. The eccentric or cam 30 is supported on a revolving tubular cam shaft 33 journaled on shaft 33'. This cam shaft 33 is driven by a crank shaft 33' and a gear 34 which, during operation, is driven by linkages 43 and 44 from the regular valve gear of the locomotive. This drive is through differential 331 which will be later described. The gear 34 is of sufficient size and weight to serve as a fly-wheel when the device is in operation so that the pitman 43 will be carried past dead center during this operation. The valve 28 is operated at all times by the cam shaft. For operating the valve 28 during starting and at slow speeds to carry over dead center, I provide means consisting of an electric motor 36 operatively connected to drive a pinion 35 which is in mesh with the gear 34. Electric motor 37 is controlled by a switch 38 preferably placed within the engine cab and by which the motor is to be thrown out of operation as soon as the engine gains speed. The electric motor is used only to boost the crank over dead center. I have shown an electric motor in this form of the invention. In other forms, I use servo-motors of various types and it will be understood that air, steam or other fluid motors could be employed in like relationship.

A differential gear 331 is employed to time the operation of the valve with reference to the rotation of the crank shaft 33'. By regulating the angle of the differential gear 331 through link 38, the relative timing of the actuation of the cut-off valve and the main engine valve is secured and I provide a screw 39 and a nut 40 driven by an electric motor 41 for effecting the angular adjustment of the differential 331. The electric switch 42 controlling the motor 41 is disposed within the cab for control of the same by the hand of the engineer. It will be recognized that by controlling the angle of the differential, the timing of the rotation of the cam shaft 33 with reference to the rotation of the crank shaft 33' is easily or readily effected.

In Fig. 14, I show an arrangement whereby a steam or air turbine is employed to carry the shaft 33 past dead center. In Fig. 14 on the shaft 33, I provide the differential 331 with the adjusting rod 38 similar to that shown in Figs. 1–8 and in place of the gear 34, I show a fly-wheel 434 which is connected to the pitman 43 as shown. On this shaft 33' I mount a conventional steam or air turbine 471 for driving the shaft past dead center. When I use the steam or air turbine, it is not necessary to provide the gearing which is provided when the electric motor 37 is used for driving the shaft 33'.

If it is desired, a two-way drive may be provided which merely calls for a duplication of the mechanism shown in Figs. 1–8 on each side of the engine.

When the engine is driven by a one side drive, it is not necessary to provide independent mechanisms for controlling the servo-motors. In such a construction the drive and control for the servo-motor cams 30 may be effected by a single drive on one side. All that is necessary to bring this about is to extend the tubular cam shaft 33 across the engine and provide a cam 30 to control the servo-motor on each cylinder. The drive of this cam shaft is then effected through a single crankshaft 33' and differential 331. In Figs. 1–8, I have shown a servo-motor 25 with its shaft 26 for operating the cut-off valve. This cut-off valve can be otherwise operated.

In Fig. 13, I show an arrangement whereby the cams 30 are driven by pitmans 43 on both sides of the engine. A shaft 433 extends between the fly-wheels 434 and a flexible coupling 400 is provided to compensate for slight differences in speed of rotation of the respective ends of the shafts caused by the imperceptible slowing down of the shafts as the pitmans 43 approach dead center position. I provide two identical differentials, one for each end of the shaft 433 which extends across the front of the engine. The gear 500 is fast to the shaft 433 and the gear 501 is fast to a sleeve 533 on which the cam 30 is fixed. The differential boxes are each provided with gearing 502 meshing with pinions 503 carried on shaft 504 and adjusted by the electric motor 506 which is employed in place of the motor 41 shown in Fig. 2.

In Figs. 9–12, I show a modification in which the cut-off valve is operated mechanically without an interposed servo motor. In Figs. 1–8, I show a servo motor operating the cut-off valve. This servo motor is timed to accomplish this at the desired time. In Figs. 9–12, I show a modification in which mechanical linkage moves the cut-off valve without the aid of a servo motor. In the modification shown in Figs. 9–12, I employ the same hollow valve stem 20 extending through the stuffing box 20' and the piston rod 17 is identical, having an extension 17" similar to the extension 17'. A bracket 173 is provided on the end of the extension valve stem 17" and a bell crank lever 363 is pivoted thereto. This bell crank lever 363 has a slot 364 engaging a pin 202 on the bracket 201 carried by the hollow cut-off valve stem 20. I operate the lever 363 by a link 365 connected to a bell crank 366 fulcrumed at 367 on the head of the cylinder 7. The bell crank 366 is operated by a control rod 370 which is fastened to the rocking member 371 provided with rollers 373 riding on cam 374 which is reciprocated by rod 372. The rocking member 371 is pivoted at 375 on the bracket 376 and the control for the movement of rod 372 is provided by the link 241 of the Walschaert valve gear mechanism which is connected by radius rod 377 and the combination lever 378 of the conventional type of gear. In my particular structure, the radius rod 379 of the main valve controlling apparatus is fitted in the slot 380 in the link 241 and the radius rod 377 is adjustable along the slot 381. By this arrangement, the single link 241 of the Walschaert gear provides adjustable operating means whereby both valves can be operated at independently timed intervals.

The operation and advantages of the structure shown in Figs. 1–8 are as follows: In ordinary engine practice, in order to provide a short cut-off, it is necessary to decrease the valve travel. When this is done, pre-admission occurs earlier in the stroke and the duration of expansion is shorter and compression is longer. It is undesirable to have compression continued long, although it is very desirable to have expansion continued as long as possible to get the full efficiency of the steam. If the valve travel is increased to give late cut-off, the period of expansion is longer and compression is shorter. It is desirable in many instances to have the early cut-off without the disadvantage of the longer compression period, which resists the effective force of the steam in the cylinder.

In the operation of my device, the main valve 10 operates at the long travel with its desirable long exhaust and short compression and the cut-off valve 14 operating independently provides the early cut-off which is most desirable and which is particularly desirable for economy if the period of compression on the opposite side of the cylinder is cut down to the minimum. In the operation of my device, the main valve 10 and the cut-off valve 14 reciprocate as a unit actuated by the Walschaert gear through the valve stem 17. The valve 10 operates substantially one-half stroke ahead of the piston with a substantially long dwell at each end of the stroke, due to the long travel possible. It will be noted that the ports 111 are somewhat narrower than the ports 91, so that during the long travel the full opening of the ports 111 is available for the admission of steam to the cylinder. In the same way, the ports 91 are large enough to provide ample exhaust clearance as at the left end of the structure viewed in Fig. 3.

In the operation of my device with the main valve 10 and the auxiliary valve 14 in the position shown in Fig. 3, the valve stem 17 shifts both valves as a unit to the right to start the admission of steam to the right hand end of the cylinder. When this admission through ports 102, 15, 101, 111 and 91 has continued the desired length of time as determined by the engineer through the adjustment of the cam 33 as above described, valve 28 is actuated and steam is admitted to the under side of piston 26 which shifts the cut-off valve 14 to the left relative to the valve 10, breaking the connection between ports 102 and 101 and preventing the passage of steam to the right hand end of the cylinder from the steam chest. The period of expansion then takes place and the main valve 10 and the valve 14 move together slowly to the left. When the piston has completed its stroke, the valve 10 carrying the valve 14, is moved to the left position lining up at the left the ports 91, 111, and 101 to permit steam to enter the left hand end of the cylinder. Since the valve 14 has been shifted to the left, the left hand port 102 is connected with the port 101 and steam is admitted from the steam chest to the left hand end of the cylinder. At the desired time the cut-off valve is shifted to the right through the actuation of valve 28 to permit steam to pass to the upper side of piston 26 as viewed in Fig. 3, cutting off the steam and permitting the cylinder event of expansion to continue, forcing the piston to the left. The port 91 at the right is then opened so that there is practically no compression, and the valve 10 with the valve 14 is shifted to the right at the proper time to continue the operation of the engine.

It will be seen that it is possible to have the long valve travel of the main piston 19 which produces a short period of compression as would be the case if long travel were used in the ordinary steam engine construction. With my structure it is possible to have a short cut-off through manipulating the cut-off valve 14 without the disadvantage of a long period of compression which would be the case with the ordinary engine valve. It will be understood also that it is possible to have the cut-off occur much later in the stroke than would be the case with the ordinary construction. In the ordinary device, a release cannot be made to occur late in the stroke, whereas by controlling cut-off and release independently, it is possible to have these events occur at any time in the course of operation. The cut-off valve is a very small mass and can be quickly and easily shifted to obtain positive cut-off and operating at 5% cut-off the cut-off valve will be shifted almost before any perceptible movement of the main valve has taken place, giving the advantage of full port opening for admission throughout the operation of the engine with positive quick cut-off at any desired point.

In the structure shown in Figs. 9–12, the operation and timing are substantially the same. Independent regulation of the cut-off and the main valve are obtained through regulation of the radius rods 377 and 379, so that any desired combination of events can take place. It is believed that it will be unnecessary to describe the operation of this structure more in detail than has already been done in view of the fact that the valve control and operation is substantially identical in every respect.

Although I have shown a steam servo motor for operating the structure in Figs. 1–8, it will be understood that compressed air or electricity could be employed with equal facility in my invention without departing therefrom.

Having thus described my invention, what I claim as new and desire to secure by Letters Patent is:

1. In a locomotive valve structure, a suitable casing, a main engine valve made up of a pair of ported heads, counterbored as cylinders and coupled together with a sleeve-like coupling and forming a complete tubular, double-headed main piston valve, and having a pair of cut-off ports formed in said valve heads to be controlled within the cylindrical bore, each head having a central hub supported by radial spider arms, an independently movable double-headed cut-off valve, the heads of which each reciprocate within the bore of the corresponding main valve head and are formed with an annular groove to couple said pairs of ports alternately for the passage of steam and to cut off the same in said head at predetermined intervals to control the cut-off of the engine, the heads of said cut-off valve being coupled together by parallel longitudinal rods disposed at each side of said hubs and between the radial spider arms, a valve stem for the main valve disposed through a suitable stuffing box on said casing head and connected to said central hubs and with an extension beyond said valve casing, a toothed rack formed on the outer end of said extension beyond said valve casing, a tubular valve stem for said cut-off valve extending through a stuffing box in the opposite head of said casing, said tubular valve stem adapted to fit the said main valve stem extension for reciprocal steam-tight engagement therewith, whereby the main engine valve may be controlled in the usual way and the cut-off valve may be independently controlled within the main engine valve by the said tubular valve stem, a bracket secured to the outer end of said tubular valve stem, a rocker pivotally connected to said bracket, an engine cylinder with reciprocating piston carried by said valve head, suitable links connecting the crosshead thereof to said rocker, an engine valve connection for controlling the piston of said engine whereby the cut-off valve will be operated by the action of the piston in said cylinder, a pilot engine valve suitably connected to control the admission and exhaust of steam from the said cylinder, a valve stem to the said engine valve bearing a suitable crosshead, a timer shaft disposed to cooperate with said crosshead, eccentric cams on said timer, cam rollers on said crosshead whereby the movement of the said engine valve is controlled by the said timer shaft, a geared balance wheel on said timer shaft, suitable connections for driving said timer shaft through said gear wheel connected to the locomotive links, an electric motor with a pinion on its driving shaft meshing with said gear to maintain the rotation thereof and avoid dead center, a differential gear for said timer shaft, connections for controlling the angle of said differential gears and thereby controlling the timing of said shaft, whereby the said engine is operated in timed relation to the said locomotive engine and the timing of the cut-off thereby determined.

2. In a locomotive valve structure, a suitable casing, a main engine valve made up of a pair of ported heads, counterbored as cylinders, and coupled together with a sleeve-like coupling and forming a complete tubular, double-headed main piston valve, and having a pair of cut-off ports formed in said valve heads to be controlled within the cylindrical bore, each head having a central hub supported by radial spider arms, an independently movable double-headed cut-off valve, the heads of which each reciprocate within the bore of the corresponding main valve head and formed with an annular groove to couple said pairs of ports alternately for the passage of steam and to cut off the same in said head at predetermined intervals to control the cut-off of the engine, the heads of said cut-off valve being coupled together by parallel longitudinal rods disposed at each side of said hubs and between the radial spider arms, a valve stem for the main valve disposed through a suitable stuffing box on said casing head and connected to said central hubs and with an extension beyond said valve casing, a tubular valve stem for said cut-off valve extending through a stuffing box in the opposite head of said casing, said tubular valve stem adapted to fit the said main valve stem extension for reciprocal steam-tight engagement therewith, whereby the main engine valve may be controlled in the usual way and the cut-off valve may be independently controlled within the main engine valve by the said tubular valve stem.

3. In a locomotive valve structure, a suitable valve casing, a main engine valve made up of a pair of ported heads, counterbored as cylinders and coupled together with a sleeve-like coupling thus forming a complete tubular, double-headed main piston valve, and having a pair of cut-off ports formed in said valve heads to be controlled within the cylindrical bore, each head having a central hub supported by radial spider arms, an independently movable double-headed cut-off valve, the heads of which each reciprocate within the bore of the corresponding main valve head and formed with an annular groove to couple said pairs of ports alternately for the passage of steam and to cut off the same in said head at predetermined intervals to control the cut-off of the engine, the heads of said cut-off valve being coupled together by parallel longitudinal rods disposed at each side of said hubs and between the radial spider arms.

4. In a locomotive valve structure, a valve casing, a main valve movable in said casing, admission ports in said main valve, a cut-off valve controlling said admission ports and carried by and movable with said main valve as a unit, and quick acting valve operating means for moving said cut-off valve independently of the movement of said main valve to move the cut-off valve from open to closed position at a predetermined point in the operation of the valve for controlling said admission ports.

5. In a locomotive cylinder valve structure having a cylinder and piston and a suitable valve casing having at each end thereof a steam port communicating with an end of the cylinder, a main engine valve movable in said casing having a head at each end movable over the steam port in the casing adjacent said head at the time of admission and movable away from said steam port during exhaust, said head having an axial bore therein to receive a head of a cut-off valve for axial movement therein and having an admission port controlled by said cut-off valve head and adapted to register with said steam port during admission, a cut-off valve for controlling said admission ports having a pair of heads, one slidably disposed in the bore of each main valve to control the admission port thereof, means for reciprocating said main valve and said cut-off valve as a unit comprising a valve stem for said main valve and a valve gear for actuating said valve stem, and means for reciprocating said cut-off valve independently of said main valve comprising a hollow cut-off valve stem surrounding said main valve stem, means on said main valve stem and on said cut-off valve stem for causing relative movement between said valve stems and means for timing the movement of both valves.

6. In a locomotive cylinder valve structure having a cylinder and piston and a suitable valve casing having at each end thereof a steam port communicating with an end of the cylinder, a main engine valve movable in said casing having a head at each end movable over the steam port in the casing adjacent said head at the time of admission and movable away from said steam port during exhaust, said head having an axial bore therein to receive a head of a cut-off valve for axial movement therein and having an admission port controlled by said cut-off valve head and adapted to register with said steam port during admission, a cut-off valve for controlling said admission ports having a pair of heads, one slidably disposed in the bore of each main valve head to control the admission port thereof, means for reciprocating said main valve and said cut-off valve as a unit, means for reciprocating said cut-off valve independently of said main valve, and means for timing the movement of the cut-off valve to move it from open to closed position at a predetermined point in the operation of the valve to change admission quickly from full to closed.

7. In a locomotive cylinder valve structure, a valve casing, a main valve movable therein for controlling cylinder events and having an admission port, a cut-off valve movably mounted on said main valve and adapted to be moved therewith as a unit, means for moving said main valve comprising a valve gear, means for moving cut-off valve independently of said main valve to control said admission port, said means including a servo motor and a pilot valve therefor, a cam for controlling said pilot valve having a pitman connection from the locomotive engine for operating said cam, a balance wheel for assuring continuous motion, and a servo motor for boosting said cam over dead center when the engine is operating at low speeds.

8. In a locomotive cylinder valve structure, a valve casing, a main valve movable therein for controlling cylinder events and having an admission port, a sliding cut-off valve movably mounted on said main valve and adapted to be moved therewith as a unit, means for moving said main valve comprising a valve gear, means for moving said cut-off valve independently of said main valve quickly from open to closed position at a predetermined point to control said admission port, said means including a servo motor.

9. In a locomotive valve structure, a valve casing, a main engine valve movable therein to control cylinder events and having an admission port, a slidable cut-off valve for controlling said admission port, a valve stem and valve gear for controlling said main valve, and valve gear means for controlling the movement of said cut-off valve independently of said main valve and for giving it constant travel.

10. In a locomotive valve structure, a valve casing, a main engine valve therein for controlling cylinder events and having an admission port therein, a cut-off valve for controlling said admission port, a valve stem and valve gear for controlling said main valve including an arcuate valve link and a radius rod, a second radius rod on said arcuate valve link, means connecting said second radius rod to control said cut-off valve, and means for adjusting said radius rods independently of each other on said valve link.

11. In a locomotive valve structure, a valve casing, a main engine valve movable therein to control cylinder events, said valve having an admission port, a slidable cut-off valve controlling said admission port, means for operating said main valve comprising a valve stem and valve gear, means for controlling said cut-off valve independently of said main valve comprising a servo motor and pilot valve, cam means for controlling said pilot valve, a balance means connected to said cam means for assuring continuous movement thereof, means driven by the locomotive for driving said cam means, and means for adjusting the timing of said valves for independent operation.

12. In a locomotive valve structure, a valve casing, a main engine valve movable therein and having an admission port therein, a cut-off valve carried by and movable on said main valve for controlling said admission port, means for moving said main valve and said cut-off valve as a unit for controlling cylinder events, comprising a valve gear and valve stem, a hollow cut-off valve stem for controlling the movement of said cut-off valve and surrounding said main valve stem, whereby the main engine valve may be controlled in the usual manner and the cut-off valve may be independently controlled on the main engine valve by said tubular stem, a bracket secured to the end of the tubular cut-off valve stem, a rocker pivotally connected to the bracket, a toothed rack formed on the main valve stem, and teeth on said rocker for engaging said toothed rack, a servo motor connected to said rocker by a link permitting movement of said valves without relative movement therebetween, said servo motor serving to operate said cut-off valve independently, a pilot valve for controlling said servo motor, a timer shaft having a cam thereon for controlling said pilot valve, a geared balance wheel on said timer shaft, links connected to the locomotive for driving said timer shaft, and a servo motor having a pinion for carrying said geared balance wheel over dead center during starting.

13. In a locomotive valve structure, a valve casing, a main engine valve movable therein and having an admission port therein, a cut-off valve carried by and movable on said main valve for controlling said admission port, means for moving said main valve and said cut-off valve as a unit for controlling cylinder events, comprising a valve gear and valve stem, a hollow cut-off valve stem for controlling the movement of said cut-off valve and surrounding said main valve stem, whereby the main engine valve may be controlled in the usual manner and the cut-off valve may be independently controlled on the main engine valve by said tubular stem, a bracket secured to the end of the tubular cut-off valve stem, a rocker pivotally connected to the bracket, a toothed rack formed on the main valve stem, and teeth on said rocker for engaging said toothed rack, a servo motor connected to said rocker by a link permitting movement of said valves without relative movement therebetween, said servo motor serving to operate said cut-off valve independently, a pilot valve for controlling said servo motor, a timer shaft having a cam thereon for controlling said pilot valve, a balance wheel on said timer shaft, and links connected to the locomotive for driving said timer shaft.

FRANK G. MARKEY.